United States Patent
Sun

(10) Patent No.: US 9,575,345 B2
(45) Date of Patent: Feb. 21, 2017

(54) DISPLAY DEVICE

(71) Applicants: BOE TECHNOLOGY GROUP CO., LTD., Beijing (CN); BEIJING BOE SPECIAL DISPLAY TECHNOLOGY CO., LTD., Beijing (CN)

(72) Inventor: Zhihui Sun, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 145 days.

(21) Appl. No.: 14/500,357

(22) Filed: Sep. 29, 2014

(65) Prior Publication Data
US 2015/0382483 A1    Dec. 31, 2015

(30) Foreign Application Priority Data
Jun. 30, 2014   (CN) .................... 2014 2 0357919 U

(51) Int. Cl.
*H05K 5/00*   (2006.01)
*G02F 1/1333*   (2006.01)

(52) U.S. Cl.
CPC ............ *G02F 1/133308* (2013.01); *G02F 2001/133322* (2013.01)

(58) Field of Classification Search
CPC ..................... H05K 5/0017; H05K 5/0004
USPC ...................................... 361/679.21
See application file for complete search history.

(56) References Cited

U.S. PATENT DOCUMENTS

| 2010/0201908 | A1* | 8/2010 | Ishida | G02F 1/133308 349/58 |
| 2012/0200803 | A1* | 8/2012 | Matsuo | G02B 6/0046 349/62 |
| 2013/0100374 | A1* | 4/2013 | Kang | G02B 6/0085 349/58 |
| 2013/0223094 | A1* | 8/2013 | Yang | G02B 6/0085 362/606 |

* cited by examiner

Primary Examiner — Tuan T Dinh
Assistant Examiner — Rockshana Chowdhury
(74) Attorney, Agent, or Firm — Nath, Goldberg & Meyer; Joshua B. Goldberg; Christopher Thomas

(57) ABSTRACT

The present invention provides a display device, including a display panel and a supporting frame arranged around the display panel, wherein at least one spacer structure is arranged between the display panel and the supporting frame, and wherein the spacer structure is fixedly mounted on the supporting frame and includes a first spacer part and a second spacer part, the first spacer part is arranged between the bottom surface of the display panel and the supporting frame, and the second spacer part is arranged between the lateral surface of the display panel and the supporting frame. Compared with the prior art, the present invention has the advantages that the impact from multiple directions to the display panel may be reduced, the probable damage to the display panel is reduced, and the quality of a product is improved.

15 Claims, 2 Drawing Sheets

DISPLAY DEVICE

FIELD OF THE INVENTION

The present invention relates to the technical field of display, and in particular relates to a display device.

BACKGROUND OF THE INVENTION

Liquid crystal displays are widely applied through recent decades of development due to the advantages of high picture quality, low power consumption, low cost and the like.

FIG. 1 shows a structural schematic diagram of an existing display device, wherein a display panel 1 and a back light source are arranged in a housing of the display device, and a supporting frame 2 for supporting the display panel 1 and pressing an optical diaphragm 3 of the back light source is arranged around the display panel 1. Meanwhile, in order to alleviate the vibration of the liquid crystal display device in the carrying process so as to prevent the display panel from being damaged, as shown in FIG. 1, a spacer 4 is arranged between the bottom surface of the display panel and the supporting frame, and the spacer 4 is made of an elastic material to alleviate the impact to the display panel 1, so as to protect the display panel 1. However, the protection effect of this method is limited, only the impact borne when the display panel is vibrated in the thickness direction thereof may be reduced, and when the vibration direction is changed (e.g. when the display panel is impacted in the direction along the surface of the display panel), the display panel is still inevitably damaged.

SUMMARY OF THE INVENTION

The object of the present invention is to provide a display device, which can reduce the impact in multiple directions to a display panel.

To fulfill the above-mentioned object, the present invention provides a display device, including a display panel and a supporting frame arranged around the display panel, wherein at least one spacer structure is arranged between the display panel and the supporting frame, and wherein the spacer structure is fixedly mounted on the supporting frame and includes a first spacer part and a second spacer part, the first spacer part is arranged between the bottom surface of the display panel and the supporting frame, and the second spacer part is arranged between the lateral surface of the display panel and the supporting frame.

Preferably, the supporting frame is provided with a first groove in a position corresponding to the first spacer part, and the first spacer part is clamped in the first groove; and/or the supporting frame is provided with a second groove in a position corresponding to the second spacer part, and the second spacer part is clamped in the second groove.

Preferably, the spacer structure further includes at least one fixing part, the fixing part is arranged on the surface of the spacer structure facing the supporting frame, the supporting frame is provided with a third groove in a position corresponding to the fixing part, and the fixing part is clamped in the third groove.

Preferably, a plurality of fixing parts are arranged on the surface of the spacer structure facing the supporting frame.

Preferably, the spacer structure is made of organic silica gel.

Preferably, the thicknesses of the first spacer part and the second spacer part are 0.6 mm-1.2 mm.

Preferably, a plurality of spacer structures are arranged between the display panel and the supporting frame.

In the present invention, the spacer structure is fixedly mounted on the supporting frame, and the first spacer part of the spacer structure is arranged between the bottom surface of the display panel and the supporting frame, so that when the display device is vibrated along the thickness direction of the display panel, the first spacer part may reduce the impact to the display panel; and the second spacer part of the spacer structure is arranged between the lateral surface of the display panel and the supporting frame, so that when the display device is vibrated along the directions perpendicular to the thickness direction of the display panel (e.g. along the length direction and width direction of the display panel), the second spacer part may reduce the impact to the display panel, the display panel is prevented from being damaged by overlarge impact when the display device is vibrated, and then the quality of a product is improved.

BRIEF DESCRIPTION OF THE DRAWINGS

The accompanying drawings are used for further understanding the present invention, constituting a part of the specification and interpreting the present invention together with specific embodiments below, rather than limiting the present invention. In the accompanying drawings.

REFERENCE SIGNS 1, 10: display panel; 2, 20: supporting frame; 3: optical diaphragm; 4: spacer; 30: spacer structure; 31: first spacer part; 32: second spacer part; 33: fixing part.

DETAILED DESCRIPTION OF THE EMBODIMENTS

The specific embodiments of the present invention will be described in detail below in combination with the accompanying drawings. It should be understood that the specific embodiments described herein are merely used for describing and interpreting the present invention, rather than limiting the present invention.

Figure 1:
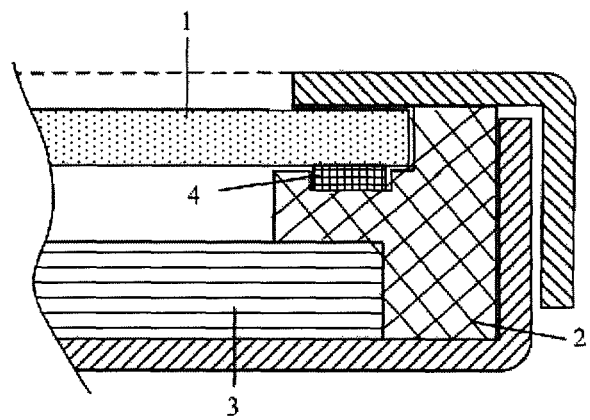
FIG. 1 shows a structural schematic diagram of a display device in the prior art.
Figure 2:
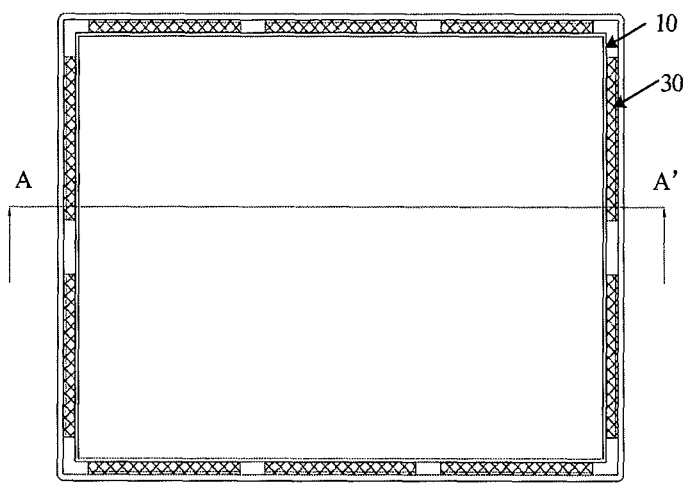
FIG. 2 shows a structural schematic diagram of a display device provided by an embodiment of the present invention.
Figure 3:
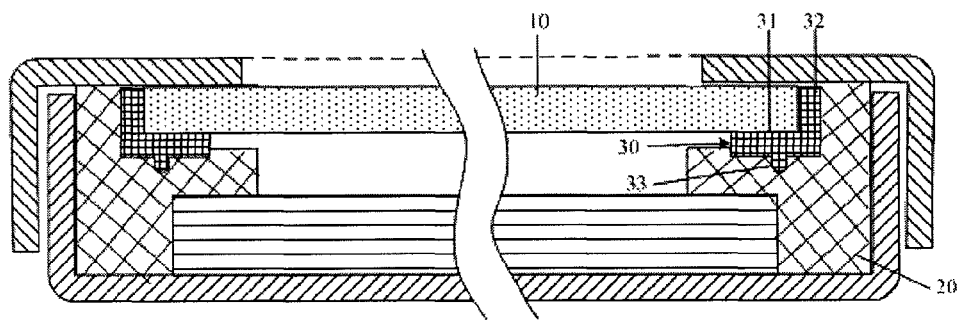
FIG. 3 shows a cross sectional view along the A-A' direction in FIG. 2.

The present invention provides a display device, as shown in FIG. 2 and FIG. 3, including a display panel 10 and a supporting frame 20 arranged around the display panel, wherein at least one spacer structure 30 is arranged between the display panel 10 and the supporting frame 20, and the spacer structure 30 is fixedly mounted on the supporting frame 20. As shown in FIG. 3 to FIG. 6, the spacer structure 30 may include a first spacer part 31 and a second spacer part 32, wherein after the spacer structure 30 and the display panel 10 are assembled into a whole, the first spacer part 31 is positioned between the bottom surface of the display panel 10 and the supporting frame 20, and the second spacer part 32 is positioned between the lateral surface of the display panel 10 and the supporting frame 20.

It could be understood that, the "bottom surface of the display panel" indicates the surface of the display panel 10 facing a back light source, and correspondingly, the "lateral surface of the display panel" indicates one of four surfaces perpendicular to the bottom surface of the display panel 10 at the edges of the display panel 10.

In the present invention, the spacer structure 30 is fixedly mounted on the supporting frame 20, and the first spacer part 31 of the spacer structure 30 is positioned between the bottom surface of the display panel 10 and the supporting frame 20, so that when the display device is vibrated along the thickness direction of the display panel 10, the first spacer part 31 may reduce the impact to the display panel 10; and the second spacer part 32 of the spacer structure 30 is positioned between the lateral surface of the display panel 10 and the supporting frame, so that when the display device is vibrated along the directions perpendicular to the thickness direction of the display panel 10 (e.g. along the length direction and width direction of the display panel), the second spacer part 32 may reduce the impact to the display panel 10, the display panel 10 is prevented from being damaged by overlarge impact, and then the quality of a product is improved.

The spacer structure 30 and the supporting frame 20 may be mounted in a non-detachable manner such as being bonded by a bonding material, or a detachable mounting manner, e.g. a protrusion is formed on the surface of one of the spacer structure 30 and the supporting frame 20, and a depression is formed at the corresponding position of the surface of the other one. For facilitating the assembling of the display device, the present invention adopts the detachable mounting manner.

As a specific implementation of the present invention, the supporting frame 20 may be provided with a first groove in a position corresponding to the first spacer part 30, and the first spacer part 31 is clamped in the first groove; and/or the supporting frame 20 may be provided with a second groove in a position corresponding to the second spacer part 32, and the second spacer part 32 is clamped in the second groove. That is, the supporting frame 20 may be provided with the first groove in a position corresponding to the first spacer part 31, for fixing the first spacer part 31 and thus fixing the spacer structure 30; or the supporting frame 20 is provided with the second groove in a position corresponding to the second spacer part 32, for fixing the second spacer part 32 and thus fixing the spacer structure 30; or the supporting frame 20 may be simultaneously provided with the first groove and the second groove, for simultaneously fixing the first spacer part 31 and the second spacer part 32 and thus fixing the spacer structure 30.

It could be understood that, to reduce the impact to the display panel 10 when the display device is vibrated, the spacer structure 30 may be made of an elastic material, the depth of the first groove may be smaller than the thickness of the first spacer part 31, and the depth of the second groove may be smaller than the thickness of the second spacer part 32, so that when the display panel 10 and the spacer structure 30 are assembled into a whole, the surface of the spacer structure 30 protrudes from the surface of the supporting frame 20, the spacer structure 30 may be fixed on the supporting frame 20, and the impact to the display panel 10 may be reduced.

Figure 4:
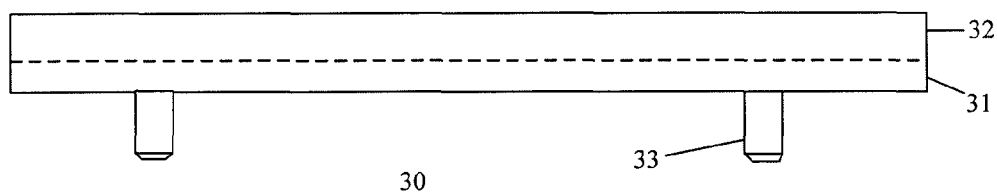
FIG. 4 shows a front view of a spacer structure provided by an embodiment of the present invention.
Figure 5:
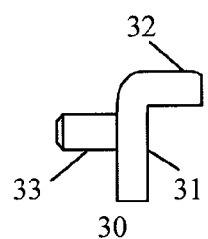
FIG. 5 shows a side view of the spacer structure provided by an embodiment of the present invention.
Figure 6:
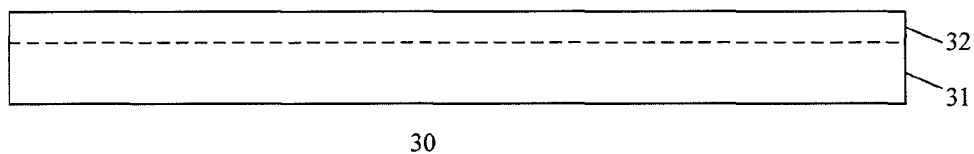
FIG. 6 shows a top view of the spacer structure provided by an embodiment of the present invention.

As another specific implementation of the present invention, as shown in FIG. 3 to FIG. 5, the spacer structure 30 may also include at least one fixing part 33, the fixing part 33 is arranged on the surface of the spacer structure 30 facing the supporting frame 20, the supporting frame 20 is provided with a third groove in a position corresponding to the fixing part 33, and the fixing part 33 is clamped in the third groove of the supporting frame 20.

The fixing part 33 may be arranged at any position, as long as the spacer structure 30 may be fixed. For example, the fixing part 33 may be arranged on the surface of the first spacer part 31 facing the supporting frame 20, or arranged on the surface of the second spacer part 32 facing the supporting frame 20; and when the spacer structure 30 includes a plurality of fixing parts 33, the fixing parts 33 may be arranged on both the surface of the first spacer part 31 facing the supporting frame 20 and the surface of the second spacer part 32 facing the supporting frame 20.

The shape of the fixing part 33 is not limited either, and the fixing part 33 may be of columnar-shaped or plate-shaped or may be of other shape with a fixing effect. The third groove may be a groove which corresponds to the columnar shape and has a circular opening, or a groove which corresponds to the plate shape and has a rectangular opening, as long as the shape of the third groove is consistent with that of the fixing part to ensure that the fixing part 33 is immobilized, so that the spacer structure 30 is fixed.

The spacer structure 30 may include a fixing part 33 or a plurality of fixing parts 33. To improve the fixing effect, further, as shown in FIG. 4, a plurality of fixing parts 33 are arranged on the surface of the spacer structure 30 facing the supporting frame 20.

As mentioned above, the spacer structure 33 may be made of the elastic material to reduce the impact to the display panel 10 when the display device is vibrated, and as a specific implementation of the present invention, the spacer structure 33 is made of organic silica gel. In the production process, to improve the production efficiency, a compression molding method may be adopted to produce the spacer structure 30.

Further, the thicknesses of the first spacer part 31 and the second spacer part 32 are 0.6 mm-1.2 mm, so that the spacer structure 30 may reduce the impact to the display panel 10 and reduce the influence of the spacer structure 30 on the thickness and border width of the display device.

Further, as shown in FIG. 2, a plurality of spacer structures 30 may be arranged between the display panel 10 and the supporting frame 20, and the plurality of spacer structures 30 are uniformly arranged between the display panel 10 and the supporting frame 20 along four sides of the display panel 10, so that when the display device is vibrated in multiple directions (any direction in a plane where the display panel is located and the thickness direction of the display panel), the impact from the multiple directions to the display panel 10 may be reduced to better protect the display panel 10.

From the above description of the display device provided by the present invention, it could be seen that, the plurality of spacer structures 30 are arranged between the display panel 10 and the supporting frame 20, and when the display device is vibrated along the thickness direction of the display panel 10, the first spacer parts 31 may reduce the impact to the display panel 10; and when the display device is vibrated along the directions perpendicular to the thickness direction of the display panel 10 (namely along any direction in the plane where the display panel 10 is located), the second spacer parts 32 may reduce the impact to the display panel 10, so that the display panel 10 is prevented from being damaged by overlarge impact when the display device is vibrated, and then the quality of the product is improved.

It could be understood that, the above implementations are merely exemplary implementations adopted for describing the principle of the present invention, rather than limiting the present invention. Various modifications and improvements could be made for those of ordinary skill in the art without departing from the spirit and essence of the present invention, and these modifications and improvements may be encompassed within the protection scope of the present invention.

The invention claimed is:

1. A display device, comprising a display panel and a supporting frame arranged around the display panel, wherein at least one spacer structure is arranged between the display panel and the supporting frame, wherein
the spacer structure is fixedly mounted on the supporting frame and comprises a first spacer part and a second spacer part, the first spacer part is arranged between the bottom surface of the display panel and the supporting frame, and the second spacer part is arranged between the lateral surface of the display panel and the supporting frame;
the supporting frame is provided with a first groove in a position corresponding to a projection portion of the first spacer part, and the projection portion of the first spacer part is clamped in the first groove; and
the supporting frame is provided with a second groove in a position corresponding to a projection portion of the second spacer part, and the projection portion of the second spacer part is clamped in the second groove.

2. The display device of claim 1, wherein the spacer structure further comprises at least one fixing part, the fixing part is arranged on the surface of the spacer structure facing the supporting frame, the supporting frame is provided with a third groove in a position corresponding to the fixing part, and the fixing part is clamped in the third groove.

3. The display device of claim 2, wherein a plurality of fixing parts are arranged on the surface of the spacer structure facing the supporting frame.

4. The display device of claim 1, wherein the spacer structure is made of organic silica gel.

5. The display device of claim 1, wherein the spacer structure is made of organic silica gel.

6. The display device of claim 2, wherein the spacer structure is made of organic silica gel.

7. The display device of claim 3, wherein the spacer structure is made of organic silica gel.

8. The display device of claim 1, wherein the thicknesses of the first spacer part and the second spacer part are 0.6 mm-1.2 mm.

9. The display device of claim 1, wherein the thicknesses of the first spacer part and the second spacer part are 0.6 mm-1.2 mm.

10. The display device of claim 2, wherein the thicknesses of the first spacer part and the second spacer part are 0.6 mm-1.2 mm.

11. The display device of claim 3, wherein the thicknesses of the first spacer part and the second spacer part are 0.6 mm-1.2 mm.

12. The display device of claim 8, wherein a plurality of spacer structures are arranged between the display panel and the supporting frame.

13. The display device of claim 9, wherein a plurality of spacer structures are arranged between the display panel and the supporting frame.

14. The display device of claim 10, wherein a plurality of spacer structures are arranged between the display panel and the supporting frame.

15. The display device of claim 11, wherein a plurality of spacer structures are arranged between the display panel and the supporting frame.

* * * * *